United States Patent [19]

Micol et al.

[11] 3,832,630

[45] Aug. 27, 1974

[54] METHOD AND APPARATUS OF MEASURING THE CHARACTERISTIC RESONANCE FREQUENCY OF AN ELECTRIC ELEMENT

[75] Inventors: Pierre Micol, Dammarie-les-Lys; Yves Jacquet, Paris, both of France

[73] Assignee: Societe Nationale D'Etude Et De Construction, Paris, France

[22] Filed: May 16, 1973

[21] Appl. No.: 360,674

[30] Foreign Application Priority Data
May 17, 1972 France .............................. 72.17608

[52] U.S. Cl. ................................ 324/56, 324/57 Q
[51] Int. Cl. ........................................... G01r 29/22
[58] Field of Search ....... 324/56, 57 Q, 78 N, 158 T

[56] References Cited
UNITED STATES PATENTS

| | | | |
|---|---|---|---|
| 2,476,954 | 7/1949 | Blackburn | 324/56 |
| 2,681,431 | 6/1954 | Wannamaker | 324/78 N |
| 2,976,604 | 3/1961 | Kosowsky | 324/56 X |
| 3,026,479 | 3/1962 | Thomas | 324/158 T |
| 3,049,666 | 8/1972 | Anderson | 324/57 Q |
| 3,095,254 | 6/1963 | Chope | 324/56 X |
| 3,230,448 | 1/1966 | Norrelgen | 324/56 X |

*Primary Examiner*—Gerard R. Strecker
*Attorney, Agent, or Firm*—William J. Daniel

[57] ABSTRACT

Apparatus for measuring a characteristic resonance frequency of an electric element, for example a piezoelectric pick-up, for the purpose of checking the condition of such element, in which the element is connected in an electric bridge fed by a variable low-frequency source, which bridge is adjusted until it is balanced, and then the frequency of the source is varied to detect the resonance. The bridge may be automatic and have purely electronic elements.

4 Claims, 8 Drawing Figures

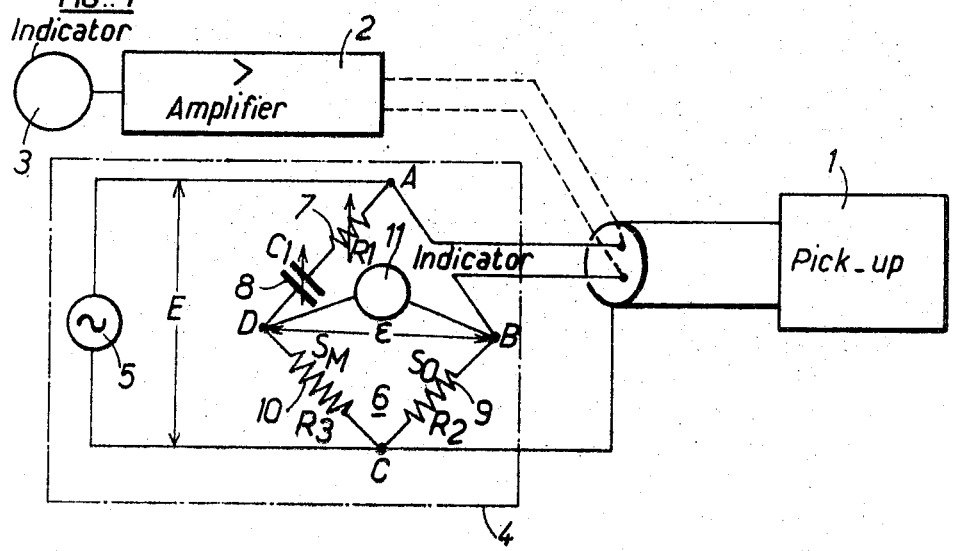
FIG.: 1
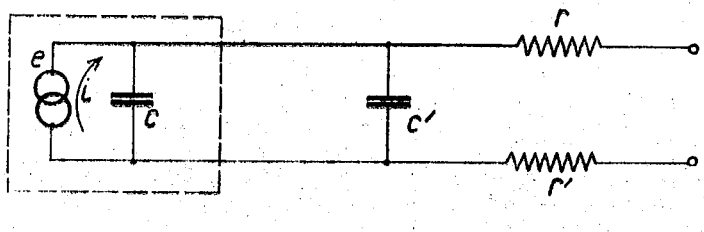
FIG.: 2
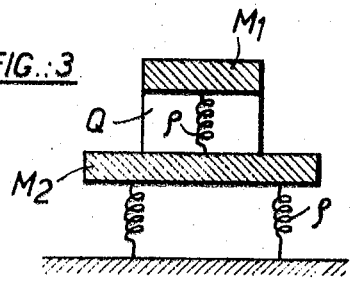
FIG.: 3

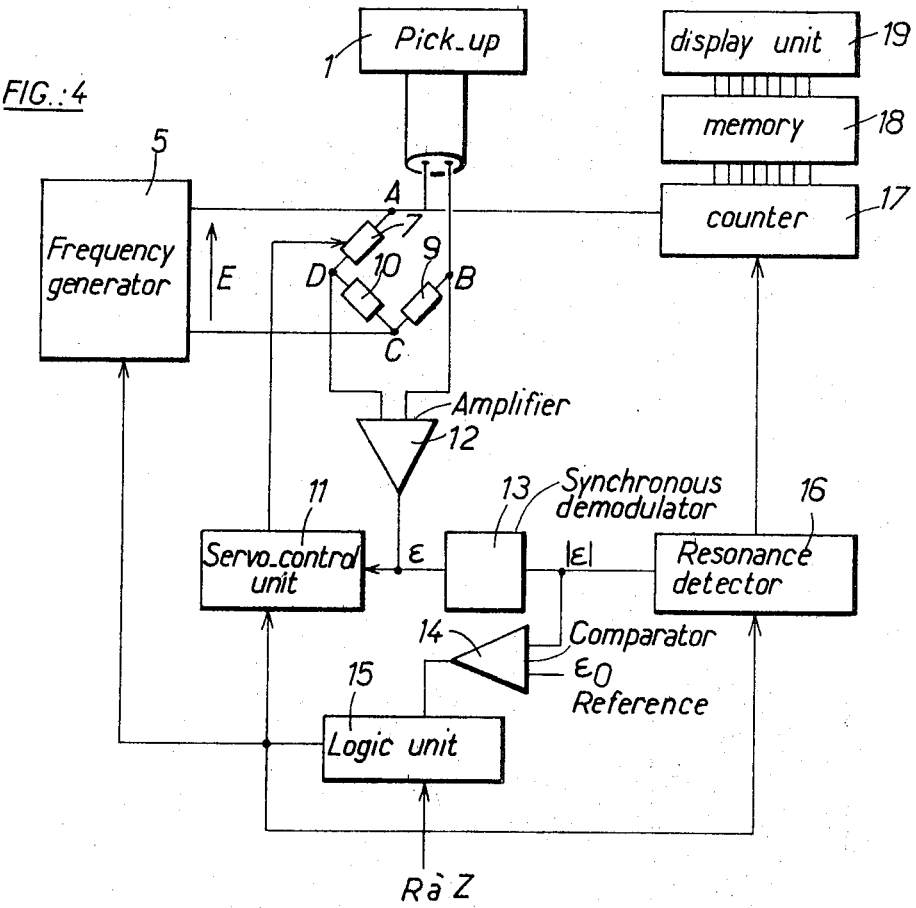
FIG.:4
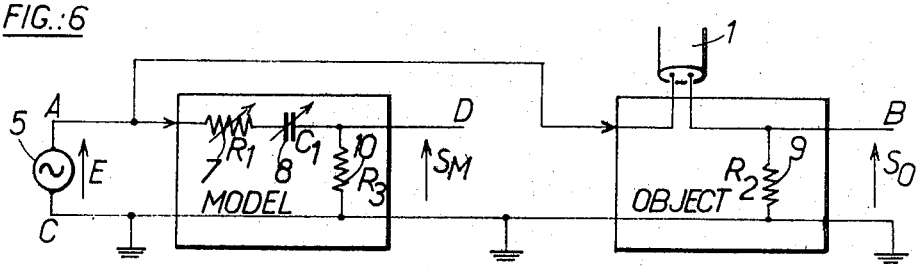
FIG.:6

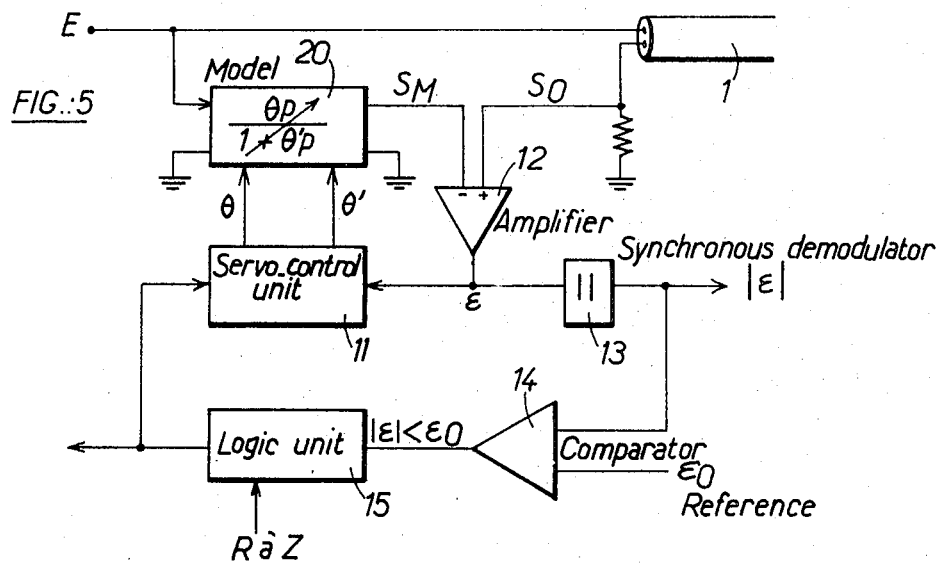
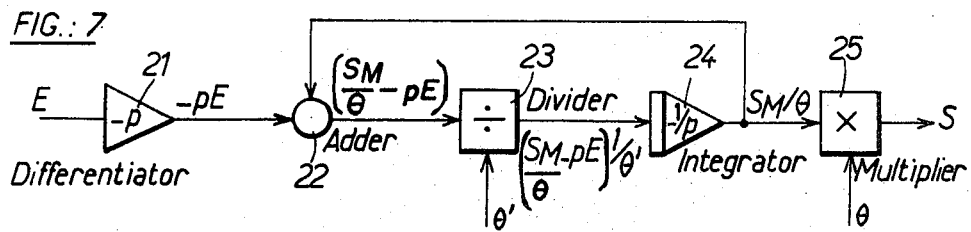
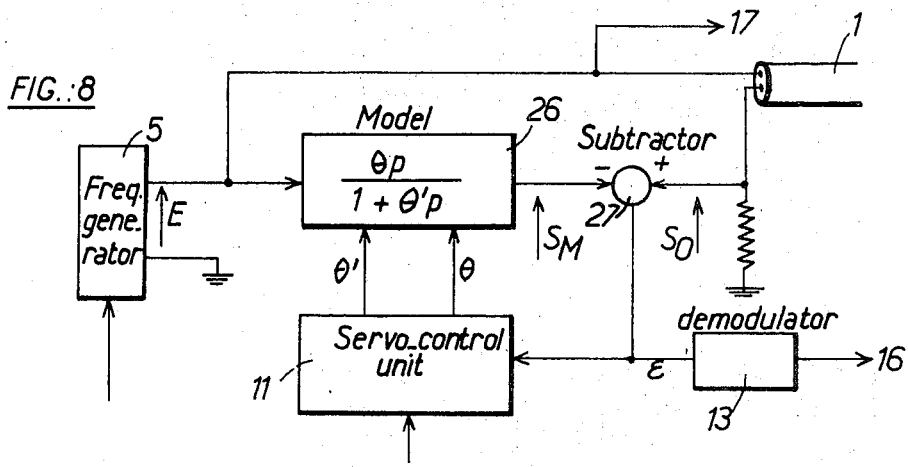

METHOD AND APPARATUS OF MEASURING THE CHARACTERISTIC RESONANCE FREQUENCY OF AN ELECTRIC ELEMENT

The present invention, which concerns a measuring or test instrument, relates more specifically to a method of checking the soundness (that is to say the good condition permitting correct operation) of an electric element, for example and in particular a piezoelectric pick-up, having at least one characteristic resonance frequency, and to an apparatus for this purpose.

For reasons of clarity and to show the motivation underlying the invention, it will be assumed in the major portion of the following description that piezoelectric pick-ups are concerned.

Piezoelectric pick-ups, for example those incorporated in quartz accelerometers, are very valuable for measuring acceleration and vibrations, but they are relatively delicate elements. Consequently, to be able to trust the information they supply, it is important to check them accurately. This usually requires that they be removed to be placed on the test and measuring apparatus (comprising an equipped vibrating table). This removal, followed by refitting, constitutes a serious drawback.

The present invention aims to avoid this drawback by permitting checking or testing "in situ."

Moreover, as will be seen, the method and apparatus according to the invention can be adapted for effecting this check accurately and automatically owing to suitable electronic means.

To this end, the invention is based on the idea that a piezoelectric pick-up in good condition has a well-defined resonance frequency which is between limits determined and known in advance (resulting from the manufacture of the pick-ups) and that its resonance frequency leaves these limits if it happens to deteriorate. This relation between good working condition and the value of the resonance frequency is confirmed by experience.

In the method according to the invention, use is made, for this purpose, of an electric bridge or equivalent circuit, the said bridge or circuit is fed by a source of alternating current the frequency of which is positively different to the resonance frequency sought and the said adjustable arm is adjusted until balance of the bridge is obtained on this supply frequency, then, without touching the adjustment of the said arm, the said supply frequency is varied until resonance is obtained, which is then measured.

The use in this method of a bridge circuit or a circuit equivalent to a bridge circuit is necessary practically speaking because the overvoltage developed by the pick-up at the resonance frequency is very low with respect to the energization voltage level applied across its terminals. This means that if the pick-up were simply fed by a source with variable frequency with a resistor in series, a voltmeter which would be connected to the terminals of the pick-up would be unable practically speaking to enable passage to the resonance frequency to be detected. This is why it is necessary to use a bridge or equivalent circuit perfectly balanced in a sufficiently wide range of frequencies.

The invention also relates to an apparatus providing the check sought, preferably with the aid of automatic means, and also to an improved apparatus in which the bridge circuit is replaced by a group of circuits which is functionally equivalent, but without mechanical adjustments, in which there is used a transfer function identifier which may advantageously be of the type described in French Pat. application No. 69,17,459.

The invention will now be further described, by way of example only, with reference to the accompanying drawings in which:

FIG. 1 shows a basic circuit diagram of the apparatus according to the invention;

FIG. 2 shows the equivalent circuit of a piezoelectric pick-up;

FIG. 3 shows the simplified mechanical set-up of a pick-up;

FIG. 4 is a diagram of an automatic checking arrangement derived from FIG. 1;

FIG. 5 is a basic circuit diagram of an arrangement equivalent to that of FIG. 1, using a transfer function identifier;

FIG. 6 is a basic circuit diagram of an apparatus according to the invention;

FIG. 7 is a representation of a "model" included in the diagram of FIG. 6; and

FIG. 8 is a diagram of a bridge circuit according to the invention, using the transfer function identifier.

A piezoelectric pick-up, such as an accelerometer, may be represented (see FIG. 2) by a source $e$ of current $i$ proportional to the acceleration exerted on the pick-up and an inherent capacity $c$ in parallel of a few hundred pF. This pick-up outputs into a line having a capacity $c'$ and with a certain resistance, which may be represented by two resistors $r$ and $r'$ in series on the two wires of the line.

Materially (FIG. 3), the pick-up itself is constituted by a quartz crystal Q compressed between two masses $M_1$, $M_2$ by a system of springs $\rho$.

This device has a natural resonance frequency defined solely by the geometry and the mechanical characteristics of the assembly comprising the quartz crystal Q and the masses $M_1$, $M_2$, by the springs $\rho$ and the elasticity of the support.

When the bridge is balanced and the pick-up is not subjected to any mechanical strain, the current $i$ is zero. The balancing compensates the capacity of the pick-up and the impedance of the line.

In FIG. 1 it can be seen how the checking apparatus according to the invention operates in principle. The piezoelectric pick-up 1 which it is a question of checking is mounted, for example, on the body of an aircraft jet engine for the purpose of detecting the vibrations thereof. To this end, it is normally connected by the connections shown in dashes to a charge amplifier 2 which is itself connected to an indicating device 3.

To check the pick-up, the jet engine is stopped so that the pick-up is no longer subjected to strains, the connection (in dashes) is disconnected and the pick-up is connected (connection in solid lines) to the apparatus 4 of the invention. This apparatus 4 (within the chain-dotted line) is preferably in the form of a suitcase so as to be easily transportable. It is essentially constituted in this case by a source 5 of alternating-current voltage of variable frequency which feeds the diagonal AC of an electric bridge 6, the arm AB of which is constituted by the pick-up 1. The adjacent arm AD of this bridge is constituted by a variable resistor 7 in series with a capacitor 8 which is likewise variable; the opposite arms BC and DC are constituted by fixed resistors 9 and 10.

If the voltage of the source 5 has as its value $E \sin \omega_o t$, there is produced between the vertices D and B an unbalance voltage $\epsilon \sin (\omega_o t + \gamma)$, which is read by a suitable indicator 11.

When the pick-up is connected to the measuring apparatus 4, the test procedure is as follows:

1. The bridge is fed by the source 5 with a voltage of frequency $f_o$ (corresponding to the pulsation $\omega o$) which is fixed at first and is positively different to and, for example, lower than, the resonance frequency of the quartz crystal. At this frequency, balancing of the bridge is carried out. This means to say that by trial and error, by successive and alternate adjustements of the values of the resistor 7 and the capacitor 8, the reading of the unbalance voltage $\epsilon$ of the bridge is brought to the lowest possible value.

2. The frequency of the source 5 is then gradually increased until an overvoltage appears across the terminals B and D and adjustment is made at its maximum.

3. The value of the frequency of the source 5 at this moment is measured or read. This frequency value enables the good condition of the pick-up to be appreciated if it is within predetermined limits established by experiment.

The above procedure according to (1), (2) and (3) is the normal procedure. Nevertheless, exceptions may occur.

For example, when it is sought to achieve balancing on frequency $f_o$, it may be found that balancing is impossible (that is to say, the error voltage remains considerable whatever is done). This normally signifies that the line of the pick-up is short-circuited. It is then appropriate to remedy this defect.

Or else, the error voltage being close to zero, there is no resonance. This means that the line is cut or that the pick-up is absolutely defective.

In any case, the apparatus according to the invention will have permitted the diagnostic sought after.

The invention also relates to an embodiment of the apparatus supplying the desired check automatically. In fact, it is obviously tedious and unacceptable for the user to have to effect a series of mechanical adjustments (of the variable resistor and the variable capacitor) and then to adjust the frequency of the generator.

According to a more developed aspect of the invention, the series of adjustments in question can be controlled by a servo system subject to the error voltage of the bridge. According to a still more developed aspect, the mechanically movable elements of the adjustable arm of the bridge or equivalent circuit are replaced by fixed elements with a value adjustable under the control of suitable voltages supplied by the servo system in question.

To explain these successive improvements, FIGS. 4 to 8 will be considered and in particular first FIG. 4, in which the reference numerals of FIG. 1 have been retained as far as possible. In particular there will be found therein:

a low-frequency generator 5 with a frequency which is variable;
a bridge in which one of the arms AB is constituted by the pick-up 1; two of the arms CB and CD are constituted by fixed resistors 9 and 10; one arm AD is automatically adjustable by means of a servo control element 11.

There is drawn from the bridge by means of an amplifier 12 an error signal voltage of which the element 13 (synchronous demodulator) supplies the absolute value $/\epsilon/$. Its magnitude is compared with a reference value $\epsilon_o$ with the aid of a comparator 14, while the error signal $\epsilon$ commands the element 11 to modify the adjustment of the arm AD. When $/\epsilon/$ is less than $\epsilon_o$, a command signal is applied to a logic element 15 which, on the one hand, stops the servo element 11, that is to say the adjustment of the arm AD, and, on the other hand triggers the frequency scanning cycle of the generator 5. At the same time, the resonance detector 16 receiving the voltage $/\epsilon/$ is activated.

When the resonance detector has detected a maximum, it commands the counter 17, which measures the frequency of the generator 5; its value is stored in 18 and displayed in 19.

Moreover, the apparatus of the invention advantageously comprises a switch or selector which has the function of adapting itself to the type of pick-up to be checked or to a particular configuration of its make-up, by modification of the calibrated resistors of the bridge and with corresponding display means.

In the apparatus of FIG. 4, the servo element has been assumed to be of a known electromechanical type with a drive motor; it is preferred, however, to resort to an entirely electronic construction.

To this end, use will be made with advantage of the teachings of the French patent already mentioned to obtain, with the aid of a "transfer function identifier," automatic balancing of the bridge or equivalent circuit. Reference will advantageously be made to this patent for further details in this connection.

In fact, if the voltage between B and C is called $S_O$ and that between D and C is called $S_M$ (FIG. 1), it may be said that the assembly of the arms AB and BC constitutes an unknown object to be identified and having an input $E$ and an output $S_O$, while the assembly of the arms AD and DC constitutes a "model" also receiving $E$ and supplying the output voltage $S_M$.

The bridge is balanced when the two output voltages $S_M$ and $S_O$ are equal at any instant. The model AD, DC then has the same behaviour and hence has identified itself with the object constituted by the pick-up and the arm BC of the bridge.

The transfer function of the model is equal to:
$S_M/E = R_3 C_1 p / [(R_1 + R_3) C_1 p + 1]$, of the form $S_M/E = \theta p / (1 + \theta' p)$ The bridge will be composed in this case (FIG. 5) of a model 20 with evolutionary coefficients $\theta$ and $\theta'$ controlled through servo channels from the error voltage.

FIG. 1 can be reproduced in the form of FIG. 6.

It can be seen that, in accordance with the aforesaid French patent, the arm A, D, C constitutes a "model" with input ($E$) and output ($S_M$), while the arm A, B, C constitutes an "object" to be identified and with the same input ($E$) and an output ($S_O$).

The balancing of the bridge consists in rendering the two voltages $S_O$ and $S_M$ equal by adjusting $R_1$ and $C_1$, which amounts to identifying the object constituted by the pick-up and the resistor $R_2$ by means of an electronic model having the same transfer function as the object.

$S_M/E = R_3/(R_1 + R_3 + 1/C_1p) = R_3C_1p/(1 + (R_1 + R_3)C_1p)$

The transfer function has the form $\boxed{S_M/E = \theta \cdot p/(1 + \theta' \cdot p)}$ with $\theta = R_3C_1$
$\theta' = (R_1 + R_3)C_1$ A possible embodiment of the electronic model having such a transfer function is given in FIG. 7.

This comprises in succession and in series:
a differentiator 21
an adder 22
a divider 23
an integrator 24
a multiplier 25.

The output of the integrator 24 is moreover connected to the second input of the adder 22. Voltages corresponding to $\theta'$ and $\theta$ are applied to the control inputs of the divider 23 and the multiplier 25.

The input and output of the integrator being respectively $(S_M/\theta - pE) 1/\theta'$ and $S_M/\theta$,
we have the equation $- (1/p\theta') [(S_M/\theta) - pE] = S_M/\theta$
that is: $S_M(1/\theta)[(1 + 1/p\theta')] = E_p/p\theta'$
$S_M/E = 1/\theta'/[1/\theta (1 + (1/p\theta')] = [(\theta/\theta') \times p\theta']/(1 + p\theta') = \theta_p/(1 + p\theta')$
which is in fact the desired function.

The voltages $\theta$ and $\theta'$ permit adjustment of the transfer function of the model in the same way as the potentiometer $R_1$ and the variable capacitor $C_1$.

The bridge circuit using the transfer function identifier is then that shown in FIG. 8.

The elements 26 and 27 of FIG. 8 are substituted and are connected to the elements 1, 5, 11, 13, 17 as indicated in FIG. 4. The model 26 is constituted in accordance with FIG. 7 and the element 27 is a subtractor. It will be noted that:

The circuit of FIG. 4 modified in this way makes it possible to identify the transfer functions
$S/E = \pm (C_p/1 + Bp)$
$S/E = \pm C_p/(1 + Ap + Bp2)$
which derive from the transfer functions
$S/E = \pm (C/1 + Bp)$ (1st order)
$S/E = \pm C/(1 + Ap + Bp2)$ (2nd order)
discussed in the aforesaid French patent owing to the presence of the differentiator 21 which enables the input $E$ to be replaced by its derivatives $E_p$.

The operation as a whole of the improved apparatus, which is similar to that already described, is then as follows:

On voltage being applied, the store is zeroed, which implies that:
the frequency of the generator is fixed $=f_o$,
the servo channels of the model are functioning,
the resonance detector is cut off,
the servo channels of the model modulate the values $\theta$ and $\theta'$ thereof and cause the error $\epsilon = S_O - S_M$ to tend automatically towards zero.

When the absolute value of the error $/\epsilon/$ is less than a given threshold $\epsilon_o$, it is considered that balancing of the bridge is obtained ($/\epsilon/<\epsilon_o$). The store is energized and the effect of this is:
to cut off the servo channels, that is to say set the values $\theta$ and $\theta'$,
to set the resonance detector in operation,
to trigger the slow and gradual rise of the frequency of the generator.

On the resonance frequency of the pick-up being reached, the resonance detector delivers a pulse which triggers a rapid measurement of the frequency $f_r$, the storage thereof and its display.

If the measured value of the resonance frequency is close to the designed value $f_s$, an "OK" signal or indicator is lit up.

It is obvious that the embodiments described are only examples and that it would be possible to modify them, in particular by substituting technical equivalents, without thereby departing from the scope of the invention.

We claim:
1. Apparatus for measuring a characteristic resonance frequency of an electrical element, in particular a piezoelectric pick-up, for the purpose of checking the condition of such element, said apparatus comprising an electrical bridge having four arms, one of said arms being constituted by the element to be measured, a second arm adjacent to the first being adjustable and constituted by a variable capacitor and a variable resistor in series, and the other two being constituted by fixed resistors; a source of voltage of variable frequency; connecting means for causing said source to feed an input voltage between the common point of the two fixed resistors and the junction point of the electrical element and said variable resistor; and means for exploiting the output voltage appearing between the other two vertices of the bridge, said last means comprising on one hand a source of reference voltage and a follow-up loop provided with output means and including a slave member for adjustment of the adjustable arm under control of said output voltage and a comparator for comparing said output voltage with the reference voltage and for controlling the slave member, whereby the balance of the bridge is obtained, and comprising on the other hand a resonance detector activated by the over-voltage delivered by the output means at the balance of the bridge.

2. Measuring apparatus as claimed in claim 1, comprising command means responsive to said comparator for stopping the slave member and, consequently, adjustment of said adjustable arm and for triggering variation of the frequency of said source, and means for measuring and recording the frequency of the input voltage which means are controlled by said resonance detector so that they become operative after actuation of said command means.

3. Measuring apparatus as claimed in claim 1, including electronic means comprising only fixed parts, the arm containing the electrical element and the adjacent arm containing a fixed resistor being assembled to constitute an unknown "object" to be identified, and the arm containing the variable capacitor and resistor and the arm containing the other fixed resistor being assembled to constitute a "model" corresponding to a transfer function which is the Laplace transform of an assembly of electrical elements connected in series, having the form $\theta/(1 + \theta'p2)$, $p$ being the corresponding complex variable, said slave member being adapted to supply signals representing the quantities $\theta$ and $\theta'$ and the comparator commanding the adjustable arm so that the output voltages of the "object" and the "model" may be equal.

4. Measuring apparatus as claimed in claim 3, in which said model further comprises connected in series, in succession, a differentiator, an adder, a divider, an integrator and a multiplier, in such a manner as to obtain the transfer function in question.

* * * * *

UNITED STATES PATENT OFFICE
CERTIFICATE OF CORRECTION

Patent No. 3,832,630   Dated August 27, 1974

Inventor(s) Pierre MICOL et al

It is certified that error appears in the above-identified patent and that said Letters Patent are hereby corrected as shown below:

In the Heading of the Patent, correct the assignee's name to read as follows: -- Societe Nationale D'Etude Et De Construction De Moteurs d'Aviation --.

Signed and sealed this 19th day of November 1974.

(SEAL)
Attest:

McCOY M. GIBSON JR.
Attesting Officer

C. MARSHALL DANN
Commissioner of Patents